Figure 1:
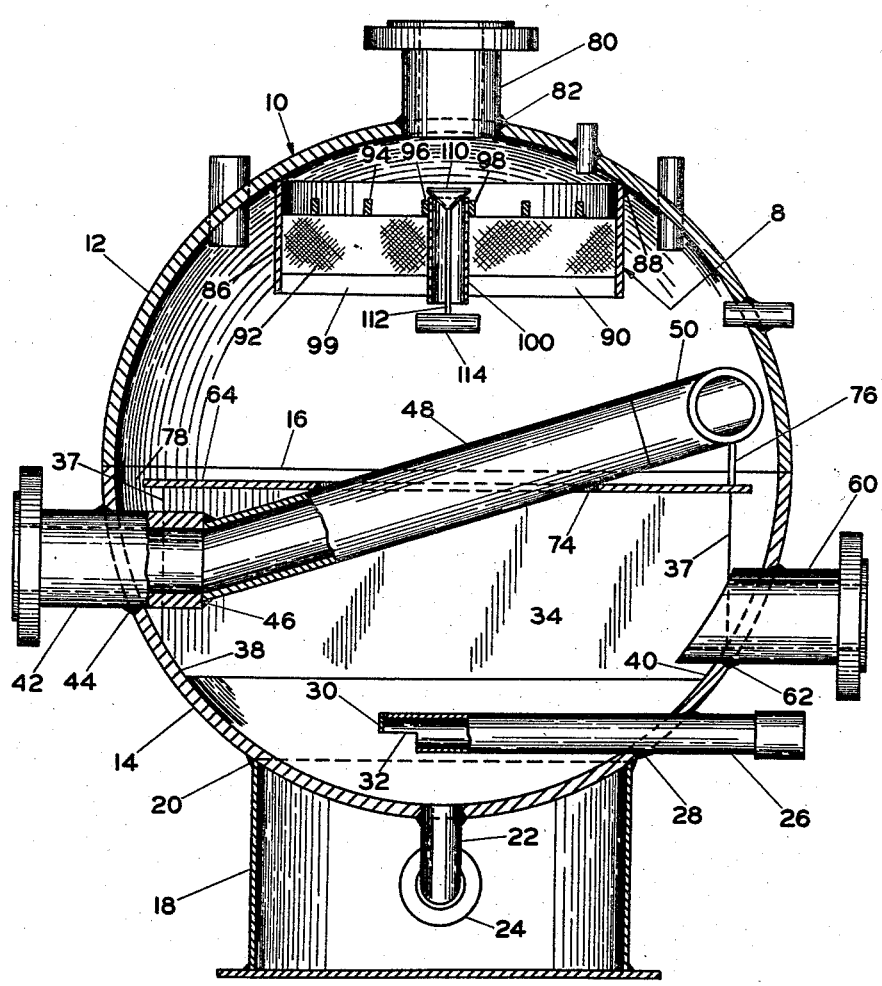

Feb. 23, 1960    D. O. SPANN    2,925,878
MIST EXTRACTOR WITH SAFETY BY-PASS
Filed April 8, 1957    2 Sheets-Sheet 1

INVENTOR.
DELROY O. SPANN
BY Diggins & LeBlanc
ATTORNEYS

Feb. 23, 1960 D. O. SPANN 2,925,878
MIST EXTRACTOR WITH SAFETY BY-PASS
Filed April 8, 1957 2 Sheets-Sheet 2

INVENTOR.
DELROY O. SPANN
BY Diggins & LeBlanc
ATTORNEYS

2,925,878

MIST EXTRACTOR WITH SAFETY BY-PASS

Delroy O. Spann, Baton Rouge, La., assignor to Delta Tank Manufacturing Co., Inc., Baton Rouge, La., a corporation of Louisiana Application April 8, 1957, Serial No. 651,540

11 Claims. (Cl. 183—2.7)

This invention relates to improvements in devices for separating entrained liquids from gases and more particularly relates to an improved demister having an integral automatic by-pass which protects the demister and the system in which it is used.

This application is a continuation-in-part of assignee's copending application Serial No. 635,067, filed January 18, 1957. In that application there is disclosed a spherical liquid and gas separator having a mist extractor mounted in the upper part thereof to effect a final removal of entrained liquid from the gas flowing from the separator. As pointed out in that application, it has been found advantageous to use a mist extractor which provides for substantial drying of the gas passing therethrough and which causes only a very low pressure drop thereacross, in order to permit the use of a pressure differential liquid level controller.

Generally speaking this type of mist extractor does not possess the ruggedness of those formed of heavy metal baffles and can be seriously damaged or destroyed if an excessive pressure drop is allowed to develop thereacross. In order to provide the high degree of drying desired this type mist extractor utilizes a very large number of exceedingly small tortuous passages, and these small passages tend to become clogged with paraffin or other foreign materials. As this clogging continues the pressure drop across the mist extractor rises, the gas throughput drops, and the mist extractor is ultimately either damaged or destroyed. In either event it is necessary to shut down the separator, remove it to a shop, cut it open, replace the mist extractor, and then re-weld the unit.

According to the present invention it has now been found that it is possible to obtain the benefits of extensive drying and low pressure drop while substantially eliminating these difficulties. According to the invention this is accomplished through the provision of a high drying capacity low pressure drop mist extractor, which incorporates integrally therein a simple, automatic resetting by-pass valve. When the mist extractor plugs with paraffin or other foreign material to a degree such that the pressure drop thereacross assumes dangerous proportions, the by-pass opens to prevent its destruction. The wetness of the gas indicates that this condition exists and the separator tank may then be flushed with steam to restore the mist extractor to its original condition without opening or dismantling the separator vessel.

The by-pass provided according to this invention comprises a simple gravity loaded valve passing directly through the mist extractor as an integral part thereof. When the pressure drop across the mist extractor exceeds a certain predetermined amount, the pressure differential causes the weight loaded valve to lift, thereby permitting the gas to be by-passed through the valve. When the pressure differential drops below this predetermined amount, the valve seats and the mist extractor is again effective. Only one moving part is utilized in the entire assembly and the construction is extremely simple so that operational difficulties are substantially completely eliminated. Surges in input to the separator are automatically taken care of by the integral by-pass in the mist extractor so that there is no necessity for an operator to observe the operation of the unit in which the mist extractor is mounted. A further feature of the unit is that when the separator is flushed or cleaned after the mist extractor has become plugged, the by-pass automatically seals so that the cleaning fluid passes through the mist extractor rather than through the by-pass valve. While the integrally by-passed mist extractor of this invention is discussed and described herein in connection with a spherical separator, this is for purposes of clarity only, and it will be clear to those skilled in the art that the mist extractor unit may be used in other environments.

It is accordingly a primary object of the present invention to provide an improved mist extractor having an integral automatically operated by-pass valve.

It is another object of the invention to provide a low-pressure drop mist extractor having an automatically operated by-pass valve.

It is another object of the invention to provide an improved mist extractor containing an integral by-pass valve comprising a weight loaded valve passing directly through the mist extractor as an integral part thereof.

It is still another object of the invention to provide a high drying capacity low pressure drop mist extractor having an integral by-pass valve mounted therein so that the unit may be mounted in a tank or other container so as to handle large variations in through-put without damage to the mist extractor even though substantial plugging of the mist extractor has occurred.

It is still a further object of the invention to provide a mist extractor unit of the foregoing type which permits cleaning of the mist extractor without opening the tank or vessel.

Figure 2:
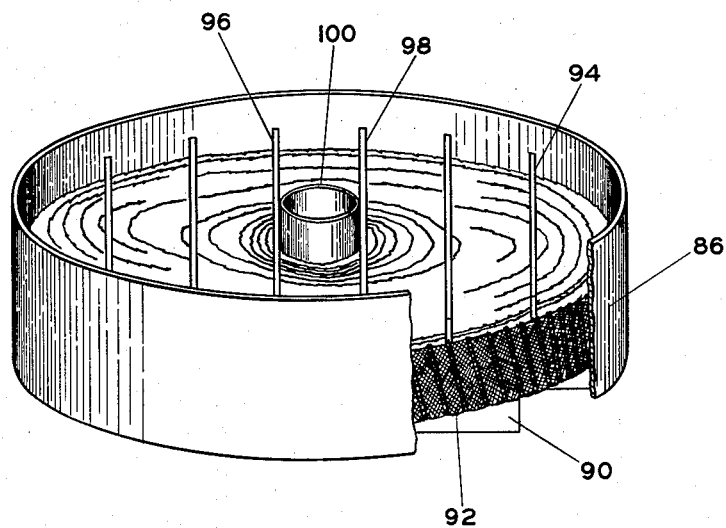

These and further objects and advantages of the invention will become more apparent upon reference to the following specification and claims and appended drawings wherein:

Figure 1 is a vertical cross-section showing a mist extractor unit constructed according to the present invention mounted in a spherical separator; and Figure 2 is a perspective view, partly in section, showing the mist extractor unit with a portion of the valve removed.

Referring more particularly to Figure 1 of the drawing, there is shown a mist extractor unit 8 constructed according to the invention mounted in a spherical liquid and gas separator 10. The separator 10 is comprised of a pair of hemispherical tank halves 12 and 14 joined by welding on a horizontal center plane 16. A base skirt 18 is welded to the lower tank half 14 at 20 to provide a support or mounting for the unit. A drain pipe 22 is connected to the bottom of the lower tank half 14 and passes through an opening 24 in skirt 18 to a suitable drain valve, not shown. An oil outlet pipe 26 extends horizontally into the lower tank half 14 and is welded thereto at 28. The inner end of oil outlet pipe 26 terminates roughly at the vertical center of the lower tank half and is closed at 30 and provided with a downwardly faced opening 32.

Mounted above the oil outlet pipe 26 in the lower tank half 14 are a pair of vertical baffle plates 34 having trimmed lower corners 38 and 40 which are welded to the interior of the lower tank half 14. The vertical baffle plates 34 are spaced approximately equidistantly of a vertical center plane passing through the oil outlet pipe 26. The vertical edges 37 of the vertical baffle plates 34 terminate short of the peripheral wall of the lower tank half, except that trimmed portions 38 and 40 are welded to the lower tank half and serve as the supporting connection for the plates, as is described in more detail in assignee's aforementioned copending application.

An oil and gas inlet 42 enters the lower tank half 14 between the vertical baffle plates 34 and is welded to the lower tank half at 44. The axis of the inlet 42 is parallel to the vertical baffle plates 34 and is approximately midway therebetween. The inlet 42 is located below the center plane 16 of the separator unit. Welded to the inlet 42 at 46 is an inlet pipe 48 which extends upwardly from the inlet 42 at an angle of approximately 20 degrees. Inlet pipe 48 terminates short of the inside wall of the upper tank half 12 and has a flow diverter 50 mounted thereon at this point. A suitable liquid level control pipe 60 also enters the lower tank half 14 substantially midway between vertical baffle plates 34 and is welded thereto at 62.

A horizontal baffle 64 is mounted atop the upper edges of vertical baffle plates 34. The baffle 64 is provided with suitable apertures and is secured to the vertical baffle plates 34 by plug welding through some of these apertures. The horizontal baffle is provided with a central elongated aperture 74 through which the inlet pipe 48 passes. An upstanding bracket 76 is welded to the horizontal baffle along the center line thereof to support the flow diverter 50. The diameter of the horizontal baffle is smaller than the diameter of the section of the lower tank half in which it is mounted so that a clearance is provided between the horizontal baffle and the inner wall of the lower tank half at 78.

A gas outlet 80 is welded to the top of the upper tank half 12 at 82. Immediately below the gas outlet 80 is mounted the mist extractor unit which is indicated generally at 8. The mist extractor described herein is of the wire mesh type which has been found particularly satisfactory, although it will be apparent that other equivalent types could be used. The mist extractor 8 comprises a cylindrical ring 86 which is welded to the upper tank half at 88 so as to seal the ring to the tank about its periphery. A series of parallel bars 90 extend across the lower end of the ring 86 and are secured thereto in any suitable manner, such as by welding. An extractor pad 92 is carried by the lower bars 90 and is secured in position by a second set of bars 94 which are also welded to the inside of the cylindrical ring 86. The bars 94 extend at right angles to the bars 90 with each set of bars forming a retaining grid.

Mounted centrally between the middle upper bars 96 and 98 and the corresponding middle lower bars 99 is a pipe 100 which is secured in position in any suitable manner, such as by welding to the bars 96, 98 and 99. The vertical length of this pipe is substantially the same as the vertical length of the ring 86. The upper end of the pipe 99 is preferably mounted below the upper end of ring 86 so that the valve may operate in a minimum of space.

The extractor pad 92 surrounds the pipe 100 and preferably consists of a roll of wire mesh which is crimped diagonally and rolled with alternate layers having crimps in opposite directions. This wire mesh is woven from a fine, stainless steel wire and may be wound around the pipe 100 in a double thickness. Wire of this type is provided in roll form.

In assembling the demister 8 shown in Figure 2, either the upper bars 94, or the lower bars 90, are welded into the ring 86 to form a first grid. The wire mesh is wound about the pipe 100 to form a round pad, and the pad is inserted in the ring 86 with the pad against the grid which has been formed.

The other bars are then welded into position to form a second grid which secures the pad in place within the ring. The pipe 100 is then welded to the middle bars 96, 98 and 99. As an alternative to winding the wire mesh about the pipe, the wire mesh may be supplied in the desired shape with an aperture in the center thereof to receive the pipe 100.

Referring to Figure 1, a conical valve seat 110 is seated on the upper end of pipe 100 and has a stem 112 depending therefrom. Attached to the lower end of stem 112 is a generally cylindrical weight 114. The stem 112 may be attached to valve member 110 and weight 114 in any suitable manner such as by screw threads, force fit, welding, etc., and is preferably attached to either the seat or the weight in a removable manner, such as by screw threads, so that the seat, stem and weight may be removed from the pipe if so desired. The weight 114 may be of any shape, but must be larger than the diameter of the pipe 100 in at least one dimension so that the seat 110 cannot be blown out of the pipe.

In the operation of the separator a mixed stream of liquid (oil, water, etc.) and gas enters the tank 10 at a relatively high velocity through the inlet 42. This stream is conducted by inlet pipe 48 across the tank and is discharged from the flow diverter 50. The streams of mixed liquid and gas issuing from the flow diverter impinge tangentially and substantially horizontally upon the walls of the upper tank half 12 and flow directly away from one another circumferentially around the inner tank surface, as is explained in further detail in the aforementioned copending application.

Gas entrapped in the liquid escapes as the mixture flows around the periphery of the tank and rises upwardly toward the mist extractor. The liquid continues on down through the space 78 between the horizontal baffle 64 and collects in the bottom of the tank. The oil thus collected is removed by the oil outlet pipe 26. The horizontal baffle prevents large liquid drops from bouncing and splashing much above the horizontal center plane of the tank.

The gas stream containing fine liquid particles below the critical separation size moves upward and enters the mist extractor uniformly over the entire lower surface of the pad 92. The gas stream then follows a tortuous upward course through the wire mesh. The fine particles of liquid entrained in the gas stream contact the wetted surface of the wire mesh and coalesce with the liquid film which is already held on the mesh by surface tension. As the liquid film becomes thicker, drops of liquid of a size too large to be held in suspension by the slowly upwardly moving gas form and fall away from the mesh and continue to fall downward through the slowly moving gas stream until they reach and commingle with the liquid body in the bottom of the lower tank half 14. A stream of dry gas leaves the top surface of the mist extractor and rapidly speeds up due to the diminishing cross-section of the tank 10 above the mist extractor. The gas leaves the tank at a high velocity through the gas outlet 80 at the top of the tank 10.

When the pressure drop across the wire pad 92 becomes excessive, either due to a clogging of the pad or an excessive feed rate, the pressure beneath the conical seat 110 causes the seat to rise against the force of gravity exerted by the weight of the weight 114 to permit gas flow through pipe 100. When this excessive pressure disappears, the weight 114 again lowers the seat 110 to return the mist extractor to a fully operative condition. This action is capable of occurring quite rapidly so that the mist extractor functions at all times except when the pressure drop across it is actually over the predetermined amount.

In particular example of a woven wire mist extractor constructed according to the invention the normal pressure drop through the demister is approximately two inches of water or about 0.07 pound per square inch. The by-pass valve is so dimensioned that it opens when the pressure drop exceeds about one pound per square inch. Since a doubling of the flow through one demister would only quadruple the pressure drop, the valve ordinarily does not open with normal changes in flow rate. On the other hand, after the unit has been in use for a period of time sufficient demister clogging may occur so that the demister is operating at a pressure drop close to the pressure which causes the valve to open. Under such conditions the valve opens and closes with surges in flow through the unit to prevent damage to the demister.

As the demister becomes more and more clogged with paraffin or other materials, it eventually becomes necessary to clean the extractor unit if it is to be operative to remove mist from the gas. This may be accomplished by supplying steam to the outlet 80 and flowing it backwardly through the separator unit. When steam is flowed through the unit in this manner, the seat 110 is forced against pipe 100 to seal off the by-pass so that the steam must pass through the wire mesh pad 92 and thereby clean the mist extractor. After cleaning has been completed, the separator may be returned to service and the mist extractor and by-pass valve resume their function, as described hereinbefore.

With a mist extractor unit of this type it is possible to use a relatively fragile wire mesh pad without encountering frequent shutdowns for repair or replacement of the pad. The vessel in which the mist extractor is confined can be sealed and the pad can be cleaned without the necessity of opening the unit. Excessive pressures across the mist extractor are by-passed automatically by the integral by-pass valve and the mist extractor is immediately returned to a fully operative condition when the excessive pressures are removed. The entire unit is extremely simple in construction and rugged in nature so that substantially no operating difficulties are encountered. Because of the unique construction of the by-pass valve, it cannot hang open when dislodged by a sudden surge of pressure. The center mounting of the valve allows the wire mesh to be coiled therearound to secure a tight fit between the extractor pad and valve. While the wire mist extractor shown comprises a preferred embodiment of the invention, other high drying capacity low pressure drop extractors may be used.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims and therefore intended to be embraced therein.

What is claimed and desired to be secured by the United States Letters Patent is:

1. A mist extractor comprising a ring having a vertical axis, a first plurality of bars extending across the bottom of said ring, a porous pad for removing liquid from a gas mounted on said bars, a second plurality of bars extending across the top of said pad within said ring and being at an angle to said first bars, an imperforate pipe passing through said pad on said axis, a valve member sealingly seated on the top of said pipe, a rod depending from said valve member and extending below said pipe, and a weight mounted on said valve member below said pipe and having at least one horizontal dimension greater than the inside diameter of said pipe.

2. A mist extractor as set out in claim 1 wherein said porous pad comprises woven wire.

3. A mist extractor as set out in claim 2 wherein said woven wire forms a cloth wound about said pipe.

4. A mist extractor as set out in claim 1 wherein said valve member has a conical lower section seating against said pipe.

5. In a process vessel for handling a liquid and a gas having a gas outlet at the top thereof, a ring sealed to the inside of said vessel completely around said gas outlet, said ring being mounted on a substantially vertical axis, a first plurality of bars extending across the bottom of said ring, a porous pad for removing liquid from a gas mounted on said bars, a second plurality of bars extending across the top of said pad within said ring and being at an angle to said first bars, an imperforate pipe passing through said pad on said axis, a valve member sealingly seated on the top of said pipe, a rod depending from said valve member and extending below said pipe, and a weight mounted on said valve member below said pipe and having at least one horizontal dimension greater than the inside diameter of said pipe.

6. A liquid and gas separator comprising a spherical tank, a liquid and gas inlet in the wall of said tank in close proximity to a horizontal plane passing through the center of the tank, an inlet conduit connected to said inlet and extending across said tank, a flow diverter associated with said conduit and defining a discharge path for discharging liquid and gas tangentially into said tank, a liquid outlet in the lower portion of said tank, a gas outlet in the upper portion of said tank, a mist extractor mounted in the path of gas flowing to said gas outlet, and an automatic resetting bypass valve connected across said mist extractor.

7. A separator as set out in claim 6 wherein said valve comprises a conduit, a valve member sealing said conduit, and weight means gravitationally urging said valve member into a sealing condition.

8. A separator as set out in claim 6 wherein said valve comprises a vertical pipe passing through said mist extractor, a valve member seating against the top of said pipe, and a weight member depending from said valve member below said pipe.

9. A liquid and gas separator comprising a spherical tank, a liquid and gas inlet in the wall of said tank near a horizontal plane passing through the center of said tank and dividing said tank in half, a liquid outlet in the lower half of said tank, a gas outlet in the upper half of said tank, a substantially vertical housing sealed to said tank at its upper end about said gas outlet, a pad of porous material carried by and extending across the lower end of said housing, a pipe passing through said pad, a valve member sealably engaging the upper end of said pipe, a rod depending from said valve member through said pipe, and a weight suspended by said rod below said pipe.

10. A separator as set out in claim 9 wherein said housing is cylindrical and said pad is secured therein by a first set of parallel bars at the bottom thereof, and by a second set of parallel bars at the top thereof, said pipe being secured to said bars.

11. A separator as set out in claim 9 wherein said weight is larger than the cross section of said pipe so as to prevent removal of said valve member from said pipe.

References Cited in the file of this patent

UNITED STATES PATENTS

| Number | Name | Date |
|---|---|---|
| 145,534 | Shepard | Dec. 16, 1873 |
| 573,342 | Miller | Dec. 15, 1896 |
| 1,195,983 | Farmer | Aug. 29, 1916 |
| 1,506,967 | Bosworth | Sept. 2, 1924 |
| 1,652,309 | Kingdon | Dec. 13, 1927 |
| 1,821,082 | Tyler | Sept. 1, 1931 |
| 1,912,235 | Winslow | May 30, 1933 |
| 2,614,654 | Strinden | Oct. 21, 1952 |
| 2,850,168 | Nostrand | Sept. 2, 1958 |